US008815083B2

(12) United States Patent
Watson

(10) Patent No.: US 8,815,083 B2
(45) Date of Patent: Aug. 26, 2014

(54) TREATING SULFUR CONTAINING HYDROCARBONS RECOVERED FROM HYDROCARBONACEOUS DEPOSITS

(71) Applicant: Merichem Company, Houston, TX (US)

(72) Inventor: John Watson, Deer Park, IL (US)

(73) Assignee: Merichem Company, Houston, TX (US)

( * ) Notice: Subject to any disclaimer, the term of this patent is extended or adjusted under 35 U.S.C. 154(b) by 159 days.

(21) Appl. No.: 13/688,665

(22) Filed: Nov. 29, 2012

(65) Prior Publication Data
US 2014/0144811 A1    May 29, 2014

(51) Int. Cl.
C10G 1/04 (2006.01)
C10G 7/00 (2006.01)
C10G 21/28 (2006.01)
C10G 1/00 (2006.01)
B01D 53/14 (2006.01)
C10G 21/14 (2006.01)

(52) U.S. Cl.
CPC .. *C10G 1/04* (2013.01); *C10G 7/00* (2013.01); *C10G 21/28* (2013.01); *C10G 1/002* (2013.01); C10G 2300/207 (2013.01); *B01D 53/1468* (2013.01); *C10G 21/14* (2013.01); *C10G 1/00* (2013.01)

USPC ............ 208/238; 208/189; 208/237; 208/390

(58) Field of Classification Search
USPC .................. 208/189, 237–238, 390
See application file for complete search history.

(56) References Cited

U.S. PATENT DOCUMENTS

| | | | |
|---|---|---|---|
| 2,431,770 A | 12/1947 | Payne et al. | |
| 4,169,506 A | 10/1979 | Berry | |
| 4,808,341 A | 2/1989 | Desgranchamps | |
| 6,565,740 B2 * | 5/2003 | Sain et al. | 208/203 |
| 6,740,230 B1 * | 5/2004 | Hugo et al. | 208/237 |
| 2007/0125686 A1 | 6/2007 | Zheng et al. | |
| 2008/0017372 A1 | 1/2008 | Gates et al. | |
| 2012/0000827 A1 | 1/2012 | Krupa et al. | |

OTHER PUBLICATIONS

International Search Report for Int. App. No. PCT/US2013/072190, completed Feb. 14, 2012.

* cited by examiner

*Primary Examiner* — Brian McCaig
(74) *Attorney, Agent, or Firm* — McDonnell Boehnen Hulbert & Berghoff LLP

(57) ABSTRACT

In a process to treat gaseous components obtained from an in situ recovery of liquid hydrocarbons from a hydrocarbonaceous deposit the mercaptans and hydrogen sulfide are separated from each other using lean oil and the hydrogen sulfide further processed to obtain a sulfur-free fuel gas product. The rich oil obtained after treating the gaseous components can be used as a diluent with the liquid hydrocarbons or processed to remove and convert the mercaptans to disulfide oils.

19 Claims, 1 Drawing Sheet

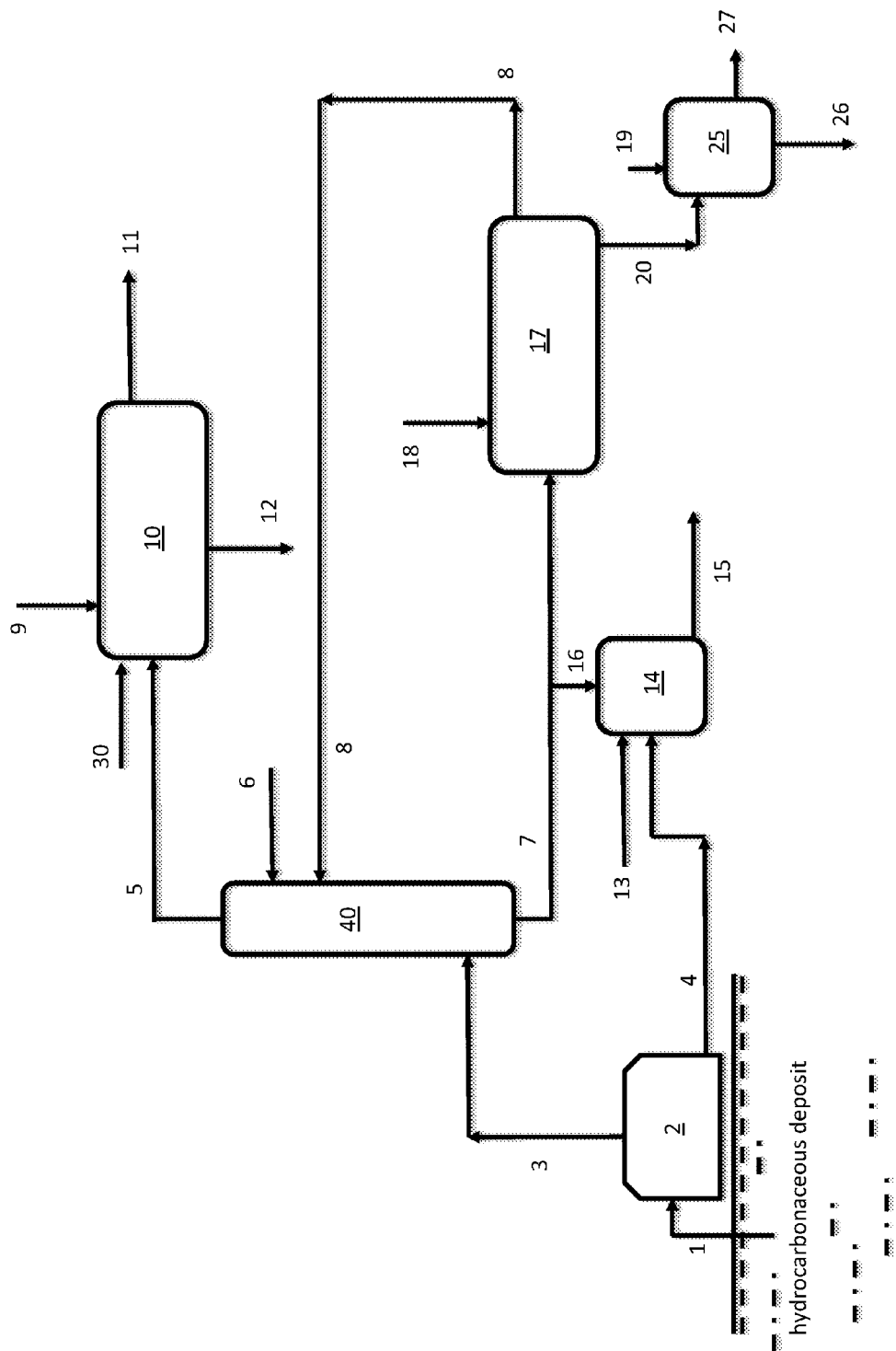

TREATING SULFUR CONTAINING HYDROCARBONS RECOVERED FROM HYDROCARBONACEOUS DEPOSITS

FIELD OF THE INVENTION

The present invention relates to methods and apparatus for treating and processing liquid, semi-solid, and gaseous hydrocarbons obtained from hydrocarbon-containing geologic materials, including tar sands, oil sands, oil sandstones, and oil shales. Specifically, my invention is directed to methods to remove sulfur contaminates found in the gaseous hydrocarbons obtained from processes such as Steam Assisted Gravity Drainage (SAGD) process.

BACKGROUND

As used herein, hydrocarbonaceous deposit is to be taken to include tar sands, oil sands, oil sandstones, oil shales, and all other naturally-occurring geologic materials having hydrocarbons contained within a generally porous rock-like inorganic matrix. The matrix may be loose, friable, or indurate.

Tar sands are naturally-occurring geological formations found in, for example, Canada (Alberta). Such sands have potential for yielding large amounts of petroleum. Tar sands are porous, generally loose or friable, and typically contain substantial amounts of clay and have the interstices filled with high-viscosity hydrocarbons known generally in the art as bitumen. Most of these tar-like bituminous materials are residues remaining after lighter (lower molecular weight) hydrocarbons have escaped or have been degraded through the action of microorganisms, water washing, and possibly inorganic oxidation. Very extensive tar sand deposits occur in northern Alberta along the Athabasca River and elsewhere. Such deposits are estimated to contain a potential yield in excess of 1.6 trillion barrels of oil.

Oil shales are related to oil sands and tar sands; however, the substrate is a fine-grained laminated sedimentary rock typically containing an oil-yielding class of organic compounds known as kerogen. Oil shale occurs in many places around the world. Particularly kerogen-rich shales occur in the United States, in Wyoming, Colorado, and Utah, and are estimated to contain in excess of 540 billion potential barrels of oil.

Hydrocarbons recoverable from tar sands and oil shales may comprise, but are not limited to, bitumen, kerogen, asphaltenes, paraffins, alkanes, aromatics, olefins, naphthalenes, and xylenes.

In the known art of petroleum recovery from hydrocarbonaceous deposits, the high molecular weight bituminous or kerogenic material may be driven out of the sands, sandstones, or shales with heat. For example, in the Steam Assisted Gravity Drainage (SAGD) process, two parallel horizontal oil wells are drilled in the formation, one about 4 to 6 meters above the other. The upper well injects steam, and the lower one collects the heated crude oil or bitumen that flows out of the formation, along with any water from the condensation of injected steam. The basis of the process is that the injected steam forms a "steam chamber" that grows vertically and horizontally in the formation. The heat from the steam reduces the viscosity of the heavy crude oil or bitumen, which allows it to flow down into the lower wellbore. The steam and gases rise because of their low density compared to the heavy crude oil below, ensuring that steam is not produced at the lower production well. The gases released, which include methane, carbon dioxide, and usually some hydrogen sulfide, tend to rise in the steam chamber, filling the void space left by the oil and, to a certain extent, forming an insulating heat blanket above the steam. Oil and water flow is by a countercurrent, gravity driven drainage into the lower well bore. The condensed water and crude oil or bitumen is recovered to the surface by use of underground system pressure or by pumps such as progressive cavity pumps that work well for moving high-viscosity fluids with suspended solids.

Once removed from the SAGD well, the dissolved and entrained gases are separated from the bitumen and then the bitumen is combined with a mid-range molecular weight "carrier" referred to as diluent, creating dilbit. Dilbit is a lighter, less viscous hydrocarbon material than the raw bitumen, and is more easily transportable via pipeline to refineries. At the refinery, the dilbit is processed to final products, and in some cases, part of the mid-range production is returned to the production site for use as diluent.

The SAGD process has a serious shortcoming with regard to the gaseous components obtained along with the liquid or semi-solid bitumen. These gaseous components include not only hydrocarbons but also undesirable sulfur containing compounds such as hydrogen sulfide ($H_2S$), mercaptans (RSH), carbonyl sulfide (COS), and carbon disulfide ($CS_2$). The associated gas initially separated from the bitumen is typically utilized at the production site as fuel to steam generators, however, the sulfur containing combustion products from using the gaseous components as fuel is a major pollution problem. The economical route to prevent sulfur air pollution is to remove the sulfur compounds from the gaseous components before it is used as a fuel. In addition to the SAGD process there are other processes for recovery of hydrocarbons from hydrocarbonaceous deposits that can benefit from my invention, for example, cyclic steam injection or "Huff and Puff" where steam is injected into the producing well (usually a vertical well) for a period, then allowed to soak and then oil is produced; or steam flood, which is similar to SAGD, but with a series of vertical wells to inject steam and recover oil; or water flood that is similar to steam flood, but uses water that can be recovered and re-injected; or gas re-injection where some of the produced natural gas is compressed and re-injected; or $CO_2$ injection where $CO_2$ from an external source is brought in to inject into the oil reservoir; or in-situ thermal methods where a portion of the well is burned underground to supply heat to the oil.

Although there are a number of regenerable processes to remove and recover sulfur from $H_2S$ containing gases, the presence of mercaptans can cause serious operational problems because these processes do not reliably remove them. In fact, the RSH will typically end up in the "sweetened" product gas, the regeneration air vent, and on the sulfur produced. COS and $CS_2$ will typically pass through and not be absorbed or converted. The strong smell of RSH makes it difficult (if not impractical) to handle the sulfur produced, and the smells in the operating unit can make it virtually inoperable. $H_2S$ can however can be easily removed and converted to elemental sulfur (S).

Accordingly, my invention is directed to removing the deleterious sulfur containing compounds, particularly RSH, from the gaseous components leaving behind the $H_2S$, which can then be treated to provide a sulfur-free gaseous fuel.

SUMMARY

My invention is directed to avoiding the problems associated with using and/or processing gaseous components obtained from hydrocarbonaceous deposits, especially those that include the recovery of bitumen from oil sands using processes such as the SAGD process. In particular, my invention is directed at treating the feed streams obtained from a SAGD process that avoids the detrimental effects of the sulfur containing mercaptan compounds that contaminate the gaseous hydrocarbons obtained in a SAGD process.

More specifically, my invention is directed to a process for treating hydrocarbons obtained from a hydrocarbonaceous deposit where the hydrocarbons include a mixture of liquid hydrocarbons and gaseous components containing hydrogen sulfide and mercaptans. This mixture is first separated into a liquid or semi-solid hydrocarbon phase and a gaseous phase comprising primarily hydrocarbon fuel gas contaminated with sulfur containing compounds, such as hydrogen sulfide and mercaptans. When the hydrocarbons are recovered from oil sands using the in situ SAGD process, the liquid or semi-solid hydrocarbons comprise bitumen. The separated gaseous components are then contacted with a lean oil (a light hydrocarbon, e.g., kerosene, naphtha or the like) such that the mercaptans are absorbed by the lean oil to form sour or rich oil. The gaseous product containing the hydrogen sulfide is separated from the rich oil and is treated to remove and/or convert the hydrogen sulfide to produce a sweet fuel gas product that can be used as a combustion product elsewhere in the above-ground facility, specifically to generate steam for the SAGD process.

The separated liquid hydrocarbons are then treated, preferably by mixing with the lean oil or an equivalent hydrocarbon to reduce the viscosity of the liquid or semi-solid hydrocarbons such that they can be transported for processing in a refinery. Alternatively, the liquid or semi-liquid hydrocarbons can be mixed with the rich oil or with a mixture of rich and lean oil. In this alternative approach the mercaptan containing rich oil accompanies the liquid hydrocarbons to a refinery where the mercaptans can be processed along with the hydrocarbons to form oil related products. In a preferred process scheme the mixture of liquid hydrocarbons and gaseous components is obtained using a SAGD process. When bitumen is the liquid or semi-solid hydrocarbon obtained in a SAGD process the addition of the diluent hydrocarbon, either lean oil, rich oil or mixture of both, results in the formation of dilbit, which can then be more easily transported to a refinery operation from the area where the SAGD in situ recovery of the bitumen occurred.

The gaseous product or mercaptans-low fuel gas obtained after contacting or scrubbing with the lean oil can be treated using a number of gas-liquid contacting processes to remove and/or convert the hydrogen sulfide to elemental sulfur. In one preferred process the gaseous product is contacted with an alkaline or caustic solution in a gas-liquid mass transfer apparatus where the hydrogen sulfide is adsorbed and converted by the caustic solution to produce a sulfur-free fuel gas that can be used for combustion in other process unit operations. The spent or sulfur rich caustic solution is then treated in a bioreactor using air where bacteria oxidize the absorbed sulfur in an oxygen-limiting condition to form elemental sulfur and at the same time regenerate the caustic solution for recycle back to contact the incoming gaseous products.

Other hydrogen sulfur removal processes that can be used to produce a sulfur-free fuel gas include those that employ the Claus reaction. For example, the mercaptans-free gaseous product can be treated in a process that uses sulfur dioxide ($SO_2$) as an oxidant to convert the $H_2S$ to elemental sulfur through a modified liquid-phase Claus reaction. The elemental sulfur formed is soluble in the reaction solution, which eliminates circulating solids in high-pressure equipment. The elemental sulfur is then crystallized and separated from the process using equipment designed to handle solids, while the rest of the process remains solids-free.

Yet another preferred process, also known as the redox method, exemplified and disclosed in U.S. Pat. Nos. 4,238,462 and 5,160,714, the teaching of which are incorporated herein by reference, involves a gas-liquid mass transfer operation where a liquid catalyst formulation is contacted with the gaseous product containing hydrogen sulfide to catalytically oxidize hydrogen sulfide to elemental sulfur, preferably using an iron chelate catalyst. The spent polyvalent metal chelate admixture is continuously regenerated by oxidation by contacting the reaction solution with dissolved oxygen, preferably in the form of ambient air, in a separate contact zone. In such a continuous process of removing hydrogen sulfide by contact, for example, with a catalytic ferric iron solution, the catalytic solution is circulated continuously between an absorber zone, where the $H_2S$ is absorbed by the catalytic ferric iron chelate solution and the solution is reduced to ferrous iron, and an oxidizer zone where the reduced ferrous iron is oxidized back to the ferric iron state.

Regardless of the process used to ultimately convert and remove the hydrogen sulfide from the gaseous product, one of the important steps in my invention is first removing the mercaptans from the gaseous components that are initially separated from the liquid or semi-solid hydrocarbons obtained from the hydrocarbonaceous deposit. The lean oil that is used to contact or scrub the gaseous components to absorb the mercaptans can include naphtha, kerosene, mid-range hydrocarbons, gasoline streams, jet fuels, diesels, and mixtures of these hydrocarbons. As mentioned, removal of the mercaptans using the lean oil can be accomplished using an absorber, preferably a counter-current gas-liquid contactor, such as a random packed column, a structured packed column or a bubble tray column. The number of transfer units (NTU) achievable is directly dependent on the type of column used and the type of lean oil used. Preferably the absorber will operate at a pressure range of from about 30-70 psig and a temperature of less than 135° F. The mercaptans content of gaseous components fed to the absorber does not need to be maintained or controlled at a specific level, however a preferred content is less than 8500 ppm by volume. The absorber column should be designed to reduce the total mercaptans concentration in the gas products to an economically feasible low level. A preferred low level would be as low as about 2 ppmv.

The rich oil obtained as a bottoms product from the absorber may be used directly as a diluent hydrocarbon by adding it to the bitumen to form a dilbit. It may be desirable that the rich oil is processed to remove the mercaptans in order to obtain a recycle or regenerated lean oil for recycle back to contact with the gaseous components and/or mixing with the liquid or semi-solid hydrocarbons recovered from the hydrocarbonaceous deposit. However, in some cases the design of the absorber may result in absorption of unacceptable levels of H2S by the lean oil, and in such situations a stripping process is required to remove the absorbed hydrogen sulfide and generate a rich oil that is essentially free of hydrogen sulfide.

The separation of the mercaptans and hydrogen sulfide from the rich oil stream is difficult to achieve. To facilitate the separation of the H2S from the rich oil the stripping column must be run at a significantly higher pressure than the absorber and requires a reflux condenser along with a bottoms reboiler. The use of a reflux condenser and reboiler allow for enough vapor and liquid traffic within the column to allow for almost all of the $H_2S$ to exit in the overhead vapors. Unfortunately, some mercaptans do slip out with the overhead vapors as well. Since the amount of mercaptans in this vapor stream is significantly lower than that of the sour gaseous components originally separated from the liquid hydrocarbons, a portion of this overhead can be recycled back to the front of the absorber where it is mixed or blended with the sour gaseous components feed.

The pressure of stripping column should be chosen to maximize the removal of the H2S. A preferred method is to run the stripping column between 50-200 psig to achieve an acceptable separation. This requires the feed or rich oil feed pump to boost the rich oil above the column operating pressure, including line and other system losses. Preferably, the rich oil is fed into the lower half of column, which is preferably a trayed distillation column. The bottoms reboiler is used to generate the necessary vapor traffic within the column to remove the $H_2S$, and subsequently a small portion of the mercaptans. As the vapors travel up the column they are contacted with rich oil and then the reflux condensate, which further facilitates the desired separation. As mentioned, because the separation is not very efficient, mercaptans tend to slip with the overhead vapors.

An alternative method to remove the mercaptans from the gaseous components is to perform a distillation process where the lean oil and gaseous components are distilled using liquid from an overhead reflux condenser and vapor from a reboiler. This alternative approach eliminates the need for the combination of absorption and stripping mentioned above.

The mercaptans rich and low hydrogen sulfide content oil exiting the scrubbing process can be further processed to remove and convert the mercaptans or, as mentioned, be used as a diluent to reduced the viscosity of the liquid or semi-solid hydrocarbons obtained from the hydrocarbonaceous deposits. If these liquid or semi-solid hydrocarbons comprise bitumen then when the rich oil is added, with or without lean oil, the resultant mixture is known as dilbit. To remove and convert the mercaptans in the rich oil, a preferred approached is to contact the rich oil with caustic whereby the mercaptans are converted to mercaptides and remain in the caustic solution thus forming a regenerated lean oil. The mercaptides in the spent caustic are eventually further processed to convert the mercaptides to disulfide oils (DSO) via an oxidation reaction, which can then be collected and further processed with the liquid hydrocarbons at a refinery. The regenerated caustic solution is then recycled to mix with fresh or make-up caustic to treat the rich oil feed.

Another more preferred process to convert (as opposed to extract) mercaptans to disulfide oils uses an aqueous treatment solution and an oxidation reaction. The disulfide oils remain in the separated hydrocarbon product stream removed from the process. More specifically, the rich oil containing mercaptans are combined with an oxygen containing gas to form a feed stream. That feed is contacted with an aqueous treatment solution comprising water, alkali metal hydroxide, a polyvalent chelated metal catalyst, in a contactor vessel, where the catalyst and oxygen are used to convert the mercaptans via an oxidation reaction to disulfide oils. The contacting step forms a product admixture that is directed to at least one separation zone, where an upgraded hydrocarbon stream containing the disulfide oils is separated from the admixture. This lean oil stream containing the DSO can be used to in addition to the lean oil described above or as a substitute thereof. The aqueous treatment solution is recirculated to treat the rich oil feed, when necessary, after being replenished with make-up catalyst and/or other ingredients of the treatment solution.

The catalyst composition used in the aqueous treatment solution is preferably a liquid chelated polyvalent metal catalyst solution. Polyvalent catalysts include, but are not limited to, metal phthalocyanines, wherein the metal cation is selected from the group consisting of manganese (Mn), iron (Fe), cobalt (Co), nickel (Ni), copper (Cu), zinc (Zn), ruthenium (Ru), rodium (Rh), palladium (Pd), silver (Ag) etc. Catalyst concentration is from about 10 to about 10,000 ppm, preferably from about 20 to about 4000 ppm. The particular catalyst selected may be included during preparation of the treatment solution and/or later added to the solution at the place of its use.

Contacting of hydrocarbon feed with the aqueous treatment solution can be accomplished by any liquid-liquid mixing device, such as packed tower, bubble tray, stirred vessel, plug flow reactor, fiber-film contactor, etc. Preferably, the contacting is performed using a contactor that achieves rapid liquid-liquid mass transfer without causing difficulties in obtaining quick and clean phase separation between the hydrocarbon and the aqueous treatment solution. Such contactors are configured to cause little or no agitation and reduce entrainment of aqueous solution in the hydrocarbon. Two or more stages of contacting with an aqueous treatment solution may be adopted to achieve a greater extent of treating efficiency.

These and other embodiments will become more apparent from the detail description of the preferred embodiment contained below.

BRIEF DESCRIPTION OF THE FIGURES

FIG. 1 schematically illustrates a process flow diagram for one possible embodiment of this invention.

DETAILED DESCRIPTION

My invention is directed to removing sulfur contaminates, specifically mercaptans, that are present in the gaseous components that are separated from liquid and/or semi-solid hydrocarbons obtained from a hydrocarbonaceous deposit, preferably from in situ SAGD processing of oil or tar sands. With reference to FIG. 1, one possible process flow scheme will be described, however, one skilled in the art will appreciate that alternative flow schemes can be devised. A mixture of liquid and/or semi-solid hydrocarbons (referred to further here as simply "liquid hydrocarbons"), gaseous components and water are obtained from a hydrocarbonaceous deposit and are delivered to separator 2 in an above ground processing facility where the gaseous components are removed via line 3 and the liquid hydrocarbons via line 4. The separated water (not shown) can be recycled to make steam for reuse in the SAGD process or used as other process water. When produced from oil sands, the liquid hydrocarbons recovered comprise bitumen.

The liquid hydrocarbons in line 4 are mixed with lean oil 13 as a diluent in vessel 14 to reduce the viscosity of the liquid hydrocarbons thus allowing for easier transport to a refinery for processing into useful hydrocarbon products. When bitumen is the liquid hydrocarbon the resulting diluted stream 15 is known as dilbit. The lean oil 13 can be any hydrocarbon or mixture of hydrocarbons capable of diluting the liquid hydrocarbons 4, preferably where the sulfur content is low. Preferred lean oils include naphtha, kerosene, mid-range hydrocarbons, gasoline streams, jet fuels, kerosenes, diesels, naphthas and mixtures there of One possible choice for the lean oil is a cracked naphtha, such as FCC naphtha or coker naphtha, boiling in the range of about 35° C. to about 230° C.

The separated gaseous components 3 comprise hydrocarbon fuel gas and sulfur contaminates, for example, mercaptans, hydrogen sulfide, carbonyl sulfide, and carbon disulfide. This sulfur contaminated fuel gas is further processed in vessel 40 to selectively extract or absorb the mercaptans over the hydrogen sulfide. This is accomplished using lean oil 6 that may or may not be the same composition as the lean oil 13 used to dilute the liquid hydrocarbons. The contacting vessel 40 may be a combination of a gas-liquid absorption column followed by a stripping fractionator or may be a distillation tower using reboil and reflux to achieve the desired separation of the mercaptans from the hydrogen sulfide. A recycled lean oil 8, as described more fully below, may also be used in addition to lean oil 6. A rich oil containing the mercaptans is removed via line 7 where all or a portion of it can be used as a diluent 16 to reduce the viscosity of the liquid hydrocarbons in treatment process 14. In such a case, the mercaptans are transported with diluent hydrocarbons and liquid hydrocarbons to a refinery where the mercaptans are eventually removed from the hydrocarbons using known processing techniques.

Alternatively, all or a portion of the rich oil 7 can be further processed on site to remove and convert the mercaptans to disulfide oils in process 17, thus producing a regenerated or recycle lean oil that can be used in contactor 40 to absorb mercaptans from the gaseous components. Process 17 preferably involves contacting the rich oil 7 with a caustic solution 18 whereby the mercaptans are converted to mercaptides that remain in the caustic solution. The spent caustic is separated from the regenerated lean oil that is removed via line 8. The separated spent caustic 20 is mixed with an oxygen containing gas, such as air, via line 19 in vessel 25 where an oxidation reaction occurs in the presence of a catalyst to convert the mercaptides to disulfide oils (DSO) and forming a regenerated caustic solution. The DSO is separated from the regenerated caustic solution and removed via line 27 for further processing or for mixing back into the dilbit. The regenerated caustic removed via line 26 can be recycle and mixed with the caustic in line 18.

The fuel gas low in mercaptans, but rich in hydrogen sulfide, is removed from process 40 via line 5 and sent to process 10 where the hydrogen sulfide is converted to elemental sulfur which is removed via line 12. A number of different processes can be used to convert and remove hydrogen sulfide to produce a sulfur-free fuel gas that is removed via line 11. One such process involves the use of a liquid-gas contactor where a caustic solution is contacted with the fuel gas and hydrogen sulfide to extract the hydrogen sulfide. The sour or spent caustic is then processed in a bioreactor to yield a regenerated caustic solution that can be recycled and added with fresh make-up caustic to treat the fuel gas and hydrogen sulfide. Alternatively, process 10 can utilize a Claus reaction or modified Claus reaction where the hydrogen sulfide is absorbed in a hydrocarbon and sulfur dioxide ($SO_2$) is used as an oxidant to convert the inlet $H_2S$ to elemental sulfur. The elemental sulfur is soluble in the resultant hydrocarbon and water solution, which eliminates circulating solids in high-pressure equipment. The sulfur is then crystallized and separated from the process using equipment designed to handle solids, while the rest of the process remains solids-free.

A third and preferred process for removing the hydrogen sulfide from the fuel gas involves contacting the $H_2S$ contaminated fuel gas with a liquid redox catalyst solution 9 and air 30 to produce a sulfur-free fuel gas 11 and elemental sulfur 12. Regardless of the process used, the sulfur-free fuel gas is most preferably used as a combustion gas to heat the other unit operations on site, most specifically to generate steam that is used in the in situ recovery of the liquid hydrocarbons from the hydrocarbonaceous deposit.

As used herein, mercaptan compounds include methyl mercaptan, ethyl mercaptan, n-propyl mercaptan, isopropyl mercaptan, n-butyl mercaptan, thiophenol and higher molecular weight mercaptans. The mercaptan compounds are frequently represented by the symbol RSH, where R is normal or branched alkyl, or aryl. Specific types of mercaptans that may be present in the gas stream and may be converted to disulfides by the oxidation process of this invention will include methyl mercaptan, ethyl mercaptan, propyl mercaptan, butyl mercaptan, pentyl mercaptan, etc.

The treatment process 17 to remove the mercaptans from the rich oil preferably uses an aqueous treatment solution containing an alkali metal hydroxide. The mercaptan level of the rich oil can range from about 10 to about 10,000 wppm, based on the weight of the rich oil. Although the above description is directed to treatment process using a two-phase treatment solution in the absence of oxygen, another approach can be to use an aqueous treatment solution in conjunction with an added oxygen-containing gas that causes the mercaptans in the hydrocarbon feed to oxidize to disulfide oils, which remain in the hydrocarbon phase. The treatment solution can be prepared by adding metal phthalocyanine catalyst to an aqueous solution of alkali metal hydroxide.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

The invention claimed is:

1. A process for treating hydrocarbons obtained from a hydrocarbonaceous deposit comprising,
    a) providing a mixture of liquid hydrocarbons and gaseous components obtained from a hydrocarbonaceous deposit, where the gaseous components comprise hydrogen sulfide and mercaptans;
    b) separating the liquid hydrocarbons from the gaseous components;
    c) contacting the gaseous components with a lean oil whereby the mercaptans are absorbed by the lean oil to form a rich oil;
    d) separating a gaseous product containing the hydrogen sulfide from the rich oil;
    e) treating the gaseous product to remove the hydrogen sulfide to produce a lean fuel gas; and
    f) treating the liquid hydrocarbons obtained in step b) to reduce viscosity prior to transporting to a refinery for processing.

2. The process of claim 1 where the mixture of liquid hydrocarbons and gaseous components is obtained using a SAGD process.

3. The process of claim 1 where the liquid hydrocarbons comprise bitumen.

4. The process of claim 1 where the treatment of liquid hydrocarbons in step f) comprises mixing the liquid hydrocarbons with a diluent hydrocarbon.

5. The process of claim 1 where the treatment of liquid hydrocarbons in step f) comprises mixing the liquid hydrocarbons with the rich oil from step d).

6. The process of claim 1 where the treatment of liquid hydrocarbons in step f) comprises mixing the liquid hydrocarbons with a diluent hydrocarbon and the rich oil from step d).

7. The process of claim 1 where the treatment of the gaseous product from step d) comprises contacting the gaseous product with a liquid solution in a gas-liquid contactor to convert the hydrogen sulfide to elemental sulfur.

8. The process of claim 1 where the treatment of the gaseous product from step d) comprises contacting the gaseous product with a liquid solution in a gas-liquid contactor followed by an oxidation reaction to convert the hydrogen sulfide to elemental sulfur.

9. The process of claim 1 where the rich oil from step d) is contacted with caustic to remove the mercaptans to form a regenerated lean oil, whereby the mercaptans are converted to mercaptides and are transferred into the caustic to form a spent caustic.

10. The process of claim 9 where the regenerated lean oil is contacted with the gaseous components in step c) to remove the mercaptans from the gaseous components.

11. The process of claim 9 where the regenerated lean oil is added to the liquid hydrocarbons in step f) to reduce the viscosity of the liquid hydrocarbons.

12. The process of claim 9 further comprises regenerating the spent caustic by
    a) mixing the spent caustic with an oxygen containing gas;
    b) oxidizing the spent caustic using a catalyst to form a regenerated caustic, whereby the mercaptides in the spent caustic are oxidized to disulfide oils; and
    c) separating the regenerated caustic from the disulfide oils and recycling the regenerated caustic for contact with the rich oil from step d) of claim 1.

13. The process of claim 1 where the contacting in step c) comprises contacting the gaseous components in a distillation column with the lean oil and distilling to form a rich oil bottoms and a mercaptan-low gas overhead comprising fuel gas and hydrogen sulfide.

14. The process of claim 1 where the contacting in step c) comprises contacting the gaseous components in a counter current liquid-gas low pressure absorption column with the lean oil.

15. The process of claim 14 further comprises fractionating to remove residual hydrogen sulfide from the rich oil.

16. A process for treating hydrocarbons obtained in situ from oil sands using a SADG process comprising,
    a) separating bitumen from gaseous components, where the gaseous components comprise hydrocarbons, hydrogen sulfide and mercaptans;
    b) mixing the bitumen with a sufficient quantity of a hydrocarbon diluent to form a dilbit;
    c) contacting the separated gaseous components from step a) with a lean oil in a counter current liquid-gas column whereby the mercaptans are absorbed into the lean oil forming a rich oil and where a mercaptan-low gaseous product is recovered; and
    d) treating the mercaptan-low gaseous product with an aqueous liquid redox catalyst solution to oxidize the hydrogen sulfide to elemental sulfur and to produce a sulfur-flee fuel gas.

17. The process of claim 16 where the rich oil is mixed with the bitumen in forming the dilbit.

18. The process of claim 16 where the rich oil is treated with caustic to remove the mercaptans to form a regenerated lean oil that is recycled and used in step c).

19. The process of claim 18 where spent caustic containing the mercaptans removed from the rich oil is mixed with an oxygen containing gas, is then oxidized using a catalyst to form a regenerated caustic, whereby the mercaptides in the spent caustic are oxidized to disulfide oils that are separated from the regenerated caustic and where the regenerated caustic is recycled for treating the rich oil.

* * * * *